Figure 3:
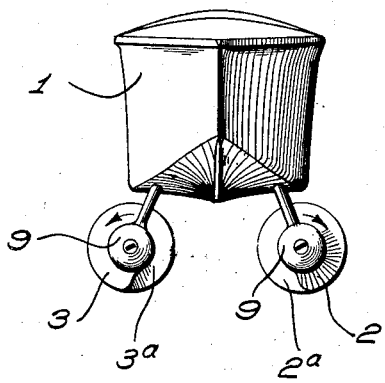

Oct. 15, 1929.   R. HARRIS   1,731,493
BOAT
Filed March 17, 1927   2 Sheets-Sheet 1
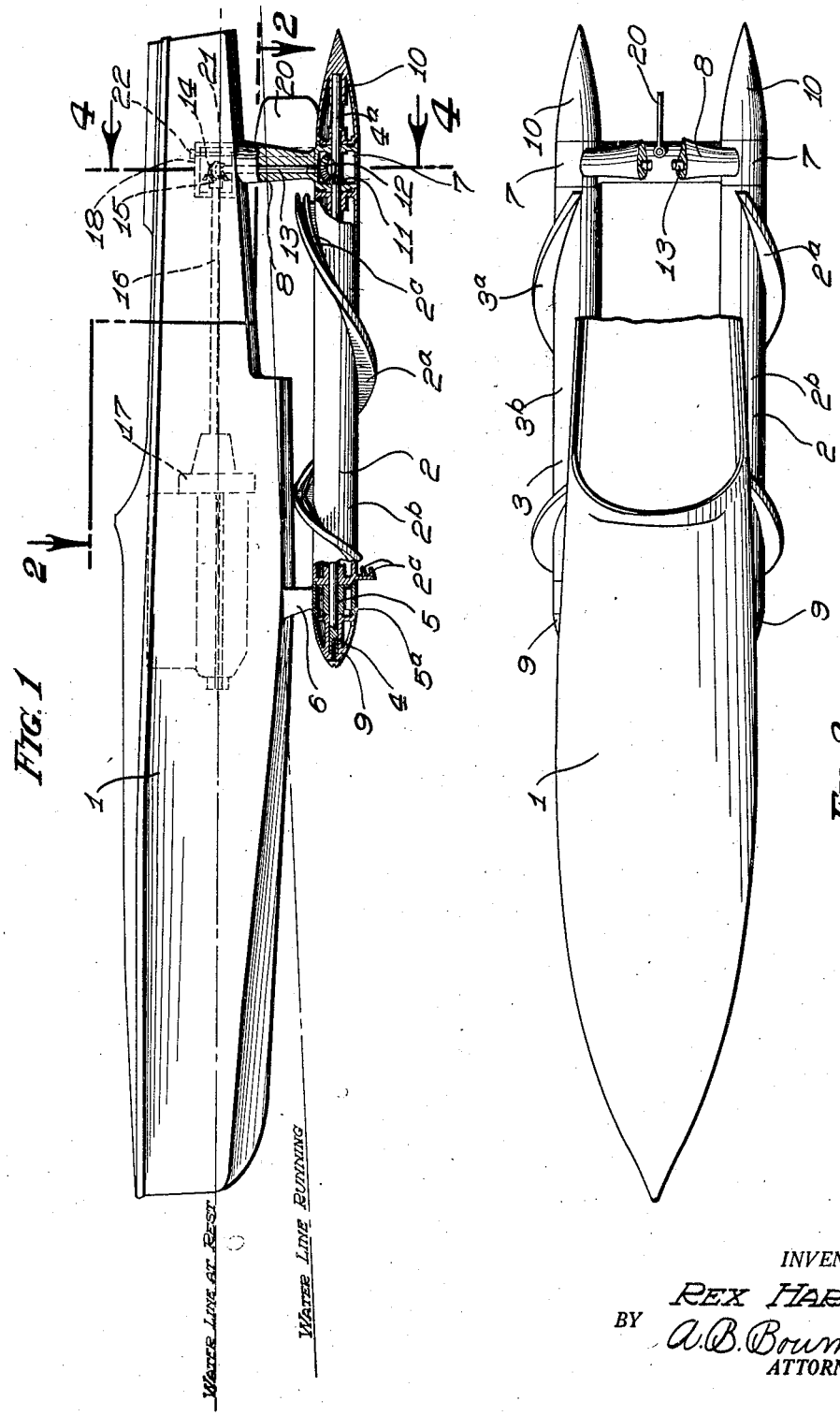

Oct. 15, 1929.       R. HARRIS       1,731,493
BOAT
Filed March 17, 1927        2 Sheets-Sheet 2

INVENTOR.
REX HARRIS
BY A.B.Bouman
ATTORNEY

Patented Oct. 15, 1929

1,731,493

UNITED STATES PATENT OFFICE

REX HARRIS, OF SAN DIEGO, CALIFORNIA

BOAT

Application filed March 17, 1927. Serial No. 176,098.

My invention relates to boats, and more particularly to speed boats and in general to small boats subjected to great loads.

The objects of my present invention are: first, to provide a boat having long helical propelling means below its hull whereby a great thrust may be obtained; second, to provide a boat of this class whereby the hull, when the boat is passing through the water at high speed, will be substantially raised above and barely skim along the surface of the water, thus materially decreasing water friction and resistance; third, to provide a boat structure having long, longitudinally extending, screw propeller means constructed around air chambers which are substantially stream-lined so that the propelling means will pass through the water below the hull of the boat with a minimum of resistance and with a tendency of raising the hull above the surface of the water; fourth, to provide a boat structure of this class having propelling means of the class mentioned at the opposite sides of its keel so that the hull is stabilized laterally as the same is raised to the surface of the water; fifth, to provide a boat structure of this class having a pair of long, longitudinally extending, helical propellers at the opposite sides of the keel and rotated in opposite directions for further stabilizing the boat; sixth, to provide a boat structure of this class having long, longitudinally extending, helical propelling means below the hull, which propelling means is so constructed that when the hull is raised to the surface of the water, substantially no waves are created, the water agitated by the propelling means being substantially only directed backwardly, thus also reducing the skin friction of the water against the hull of the boat; seventh, to provide a boat structure of this class whereby substantially high speeds may be obtained, and also a boat structure whereby relatively great thrust may be obtained with a small boat; eighth, to provide novel means for operating propeller means of the class mentioned; ninth, to provide, as a whole, a novelly constructed boat structure; and tenth, to provide a boat structure of this class which is simple and economical of construction proportionate to its functions, durable, efficient and which will not readily deteriorate or get out of order.

Figure 4:
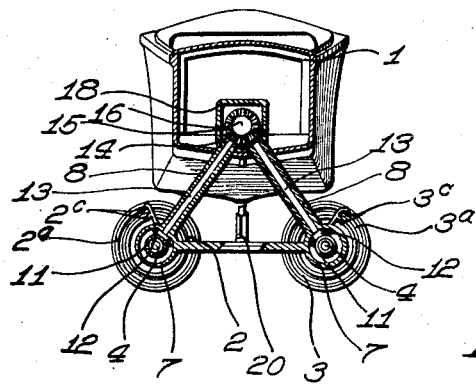

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side view of a boat structure incorporating my invention, portions of the propelling and supporting means therefor being broken away and in section to facilitate the illustration; Fig. 2 is a partial plan and partial sectional view thereof taken on the line 2—2 of Fig. 1; Fig. 3 is a front view of my boat structure; and, Fig. 4 is a sectional view thereof taken through 4—4 of Fig. 1.

Like characters of reference refer to similar parts and portions throughout the several views of the drawings.

The hull 1 of the boat structure shown may be of substantially the same lines as employed in speed boat hulls. Below the hull and at the opposite sides of the keel thereof, and preferably near the rear end thereof, are provided propellers 2 and 3 which are respectively provided with helical vanes $2^a$ and $3^a$ of opposite pitch, said propellers also rotating in opposite directions, as indicated by arrows in Fig. 3. Said propellers are mounted on shafts 4 which are revolubly mounted at their forward and rear ends in journals 5 and 7, respectively, said journals being supported by struts 6 and 8, respectively, which extend downwardly and outwardly from the hull 1, the struts 6 being positioned slightly forwardly of amidship and the struts 8 extending downwardly and outwardly from the hull slight distances forwardly of the stern.

The bodies, indicated by $2^b$ in Fig. 1, are tubes of large diameter and serve as air tanks which tend to raise the boat structure to the surface of the water. Around these tubular bodies are constructed the vanes $2^a$ and $3^a$, respectively, of opposite pitch, the pitch thereof increasing toward their rear ends. The vanes 2ª and 3ª are in the form of helicoids and are provided at their backs or rear sides with backwardly extending, relatively narrow vanes 2ᶜ and 3ᶜ which are also helical. The vanes 2ᶜ and 3ᶜ prevent the water, agitated by the helicoid vanes 2ª and 3ª, from being thrown outwardly or radially, but direct the water backwardly, thus increasing the thrust of the vanes 2ª and 3ª and confining the agitation to substantially the diameter of the propellers. There are preferably provided several backwardly extending vanes 2ᶜ and 3ᶜ, as shown, which are spaced radially from each other with respect to the axis of the propellers.

To the forward ends of the shafts 4 are secured pointed heads 9 which rotate with the shafts and reduce the head resistance of the propellers. The journals 5, being of smaller diameter than the heads 9 and the bodies of the propellers, are preferably surrounded by casings 5ª which are secured to the journals and are of the same diameters as the heads 9 and the bodies of the propellers to further reduce the head resistance. The heads 9 preferably overlap the forward ends of the casings 5ª, and the latter preferably extend a slight distance over the forward ends of the bodies of the propellers.

The journals 7 are constructed in the form of gear boxes of the same diameters as the bodies of the propellers, thus permitting the water from the propellers to flow smoothly around the outer sides of the gear boxes or journals 7. To the rear ends of the shafts 4, which extend backwardly beyond the journals 7, are secured substantially cone-shaped furring members 10, providing stream-lined terminations for the bodies of the propellers and the gear boxes 7.

Within the gear boxes 7, and on the shafts 4 extending therethrough, are mounted several gears 11 which are rotated by bevel gears 12 secured to the lower ends of shafts 13. The shafts 13 extend through and are revolubly mounted in the struts 8 near the forward edges of the latter, it being noted that the struts 8, as well as the struts 6 are of narrow and stream-lined construction. The bevel gear 11 within the gear box 7 at the port side of the hull, as shown, is positioned against the journal portion at the forward side of the gear box, while the gear 11 in the gear box at the starboard side of the hull is positioned against the journal portion at the aft wall of the gear box, so that the shafts and the propellers mounted thereon, are rotated in opposite directions by the shafts 13 which revolve in the same directions.

The upper ends of the shafts 13 terminate in a gear box 18 and are provided at their upper ends with bevel gears 14 which are both driven by a bevel gear 15 secured to the rear end of the main drive shaft 16 coupled with the power plant 17 which may be in the form of an ordinary internal combustion engine.

The gear boxes 7 may be connected laterally by a horizontal strut 19 which is also streamlined. If a rudder, indicated by 20, is employed, this strut 19 may serve as the lower journal for the rudder post 21 which may extend upwardly through the gear box 18 and which may be provided at its upper end with a rudder bar 22, or any other means for controlling the rudder.

It will be here noted that in the structure illustrated and described, the propellers 2 and 3 are operated at the same time. In ship construction, employing two propellers, one of the propellers is slowed up or reversed, thus steering the craft without employing a rudder. The same operation may be resorted to in my boat by providing separate connecting means to the main drive shaft.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a boat structure, a hull, struts depending from said hull from near its middle portion and its stern, propelling means revolubly mounted on and supported by said struts, said propelling means being totally submerged at all speeds, and drive means extending through said rear struts for rotating the propelling means.

2. In a boat structure, a hull, struts depending from said hull from near its middle portion and its stern, a long, continuous helical propeller revolubly mounted on and between said struts, said propelling means being totally submerged at all speeds, and drive means extending through said rear struts for rotating said propeller.

3. In a boat structure, a hull, struts depending from said hull from near its middle portion and its stern, a propeller body of long, tubular construction revolubly mounted on and between said struts, said propeller body having a continuous helical vane at its exterior, the rear strut having a gear box at its lower end of the diameter of said propeller body, said gear box having journals for revolubly supporting said body, gear means in said gear box for rotating said body, a shaft extending through the rear strut from the hull for operating said gear means, and a stream line member secured to the rear end of the shaft and revoluble therewith, the forward end of the stream line member being of substantially the size of the gear box.

4. In a boat structure, a hull, a pair of long, longitudinally extending, helical propellers revolubly mounted below said hull and at the opposite sides of the keel thereof, said propellers being totally submerged at all speeds, struts extending downwardly from said hull for supporting said propellers relative thereto, and means in said struts for operating said propellers from said hull.

5. In a boat structure, a hull, a pair of long, longitudinally extending, helical propellers revolubly mounted below said hull and at the opposite sides of said keel thereof, struts extending downwardly from said hull for supporting said propellers relative thereto, a horizontal strut connecting the lower ends of said first mentioned struts, a rudder post extending downwardly from said hull and journaled at its lower end in said horizontal strut, and a rudder mounted on said rudder post between said propellers.

In testimony whereof, I have hereunto set my hand at San Diego, Calif., this 11th day of March, 1927.

REX HARRIS.